(12) United States Patent
Gebhardt et al.

(10) Patent No.: US 8,160,921 B2
(45) Date of Patent: Apr. 17, 2012

(54) SYSTEM FOR INCENTIVIZING FINANCIAL ACCOUNT USERS

(75) Inventors: Pamela K. Gebhardt, Greendale, WI (US); Clarence D. Masshardt, Jr., Germantown, WI (US); Sean D'Esposito, Cudahy, WI (US); Eric S. Shaw, Waunakee, WI (US)

(73) Assignee: Marshall & Ilsley Corporation, Milwaukee, WI (US)

( * ) Notice: Subject to any disclaimer, the term of this patent is extended or adjusted under 35 U.S.C. 154(b) by 420 days.

(21) Appl. No.: 12/608,719

(22) Filed: Oct. 29, 2009

(65) Prior Publication Data

US 2011/0106602 A1 May 5, 2011

(51) Int. Cl.
*G06Q 30/00* (2006.01)
*G06Q 40/00* (2006.01)

(52) U.S. Cl. ............... 705/14.17; 705/14.34; 705/14.35; 705/35

(58) Field of Classification Search ............... 705/14.17, 705/14.34, 14.35, 35
See application file for complete search history.

(56) References Cited

U.S. PATENT DOCUMENTS

| | | | |
|---|---|---|---|
| 7,318,049 B2 | 1/2008 | Iannacci | |
| 7,392,224 B1 * | 6/2008 | Bauer et al. | 705/41 |
| 7,430,521 B2 | 9/2008 | Walker et al. | |
| 7,580,856 B1 | 8/2009 | Pliha | |
| 2003/0236712 A1 | 12/2003 | Antonucci et al. | |
| 2004/0122736 A1 | 6/2004 | Strock et al. | |
| 2005/0010523 A1 | 1/2005 | Myklebust et al. | |
| 2005/0021402 A1 | 1/2005 | Strasser | |
| 2005/0131792 A1 | 6/2005 | Rowe | |
| 2007/0027799 A1 | 2/2007 | Manelis et al. | |
| 2007/0136135 A1 | 6/2007 | Loeger et al. | |
| 2007/0156523 A1 | 7/2007 | Liu et al. | |
| 2007/0156530 A1 | 7/2007 | Schmitt et al. | |
| 2007/0181674 A1 | 8/2007 | Taylor et al. | |
| 2008/0040222 A1 | 2/2008 | Gee | |
| 2008/0059303 A1 | 3/2008 | Fordyce | |
| 2008/0082407 A1 | 4/2008 | Georgiadis et al. | |
| 2008/0294513 A1 | 11/2008 | Buse, Jr. | |
| 2008/0319854 A1 | 12/2008 | Duroux et al. | |
| 2009/0006212 A1 | 1/2009 | Krajicek et al. | |
| 2009/0112639 A1 | 4/2009 | Robinson Beaver | |
| 2009/0171776 A1 | 7/2009 | Scipioni | |
| 2009/0198572 A1 | 8/2009 | Jurgens | |
| 2009/0199094 A1 | 8/2009 | Jurgens et al. | |
| 2011/0106602 A1 * | 5/2011 | Gebhardt et al. | 705/14.17 |

OTHER PUBLICATIONS

Definition of "transaction deposit" downloaded Feb. 12, 2012 from http://www.investopedia.com/terms/t/transaction-deposit.asp#axzz1mB8z1hOA.*
Taylor, Lisa Y, "Poinrts of Interest", San Antonio Business Journal v17 n1 p. 30, Jan. 24, 2003.*
Visa Debit/Check card, downloaded Feb. 12, 2012 from http://usa.visa.com/personal/cards/debit/index.html.*
Debit card, Wikipedia article downloaded Feb. 12, 2012 from http://en.wikipedia.org/wiki/Debit_card.*
Bruene, Jim; "Bankinig Continues to Become More Rewarding"; Comments from "Points from National City", Mar. 20, 2006 12:48 PM.

* cited by examiner

(Continued)

*Primary Examiner* — Donald I. Champagne
(74) *Attorney, Agent, or Firm* — Reinhart Boerner Van Deuren s.c.

(57) ABSTRACT

A system to incentivize financial account holders, such as a checking account, by providing a cash bonus for certain activities in the financial account, including certain deposits, electronic payments, debit card purchases, and receiving an electronic statement (instead of paper statements). The cash bonus is calculated on the current time period, for example monthly and credited to the financial account at the end of such current time period.

29 Claims, 3 Drawing Sheets

SYSTEM FOR INCENTIVIZING FINANCIAL ACCOUNT USERS

BACKGROUND OF THE INVENTION

Field of the Invention

This disclosure relates generally to financial accounts for financial institutions, and more particularly to a system to encourage owners of financial accounts to utilize electronic transactions with the financial account.

Financial institutions such as banks spend a large amount of money on the processing of paper checks, and typically are not reimbursed for such costs by consumers who typically use free checking accounts. One way to help the financial institution save money is through the use of fewer paper checks and reducing paper activity through on-line statements, transactions, deposits, etc. The potential beneficial effect of electronic bill payment for cost reduction and revenue production to all participants, billers, consumers, banks, and service providers, represents a tremendous opportunity for the financial industry. Encouraging a customer or consumer to transact business with the financial institution through the financial account at the financial institution on an electronic or on-line basis rather than through conventional paper check writing, account statements, deposit slips, etc. has been a difficult task for financial institutions to stimulate.

Some financial institutions offer reward programs in which a consumer or user of a particular financial account receives reward points that can be redeemed for merchandise or service. Typically such reward points are redeemable from a pre-selected supplier or list of a plurality of pre-selected suppliers with such reward points being available only for a fixed period of time. Such systems do not provide selection opportunities to the user or consumer outside of such pre-selected suppliers or outside of such fixed time periods. Such arrangements do not necessarily encourage increased use of electronic or on-line transactions, particularly if the user or consumer is not predisposed to use the pre-selected suppliers or cannot redeem the reward points within the specified time periods. Accordingly, the consumer may not be inclined to utilize electronic or on-line transaction procedures.

SUMMARY OF THE INVENTION

The disadvantages and limitations of the background art discussed above are addressed by the present system.

There is a provided a system that is configured to influence the behavior of a user of a financial account. The system includes a computer readable database configured to store account data and a computer processor coupled to the database. The computer processor is configured to establish user identity in the database and create a financial account for each user in the database. The computer processor is also configured to assign a transaction code to each type of deposit transaction associated with the financial account and to total each type of deposit transaction based on the transaction code during a current time period. The computer processor is further configured to determine a net sum of the value of all signature card transactions associated with the financial account less the value of all signature card returns associated with the financial account during the current period resulting in a net signature card transaction amount. The system also pairs the electronic debits transacted in the financial account during the current time period. An e-statement is issued for the financial account at the end of the current time period. The computer processor is also configured to include an incentive calculation logic module configured to automatically calculate a cash product to the financial account for the current time period based on the net sum of the net signature card transactions, the total electronic debit transactions, the total of deposit transactions, and the issuance of the e-statement. The cash credit encourages the user to engage in electronic utilization of the financial account.

There is also provided a system configured to influence the behavior of the user of a financial account. The system includes a computer readable database configured to store account data and a computer processor coupled to the database. The computer processor includes a means to establish user identity in the database, a means to create a financial account for each user in the database, a means to assign a transaction code to each type of deposit transaction associated with the financial account and totaling each type of deposit transaction based on the transaction code during a current period, a means to determine a net sum of the value of all signature card transactions associated with the financial account less the value of all signature card returns associated with the financial account during the current period, a means to total electronic debits transacted in the financial account during the current period, a means to issue an e-statement for the financial account at the end of the current period, and a means to automatically calculate a cash credit to the financial account for the current period based on the net sum of the net signature card transactions, the total electronic debit transactions, the total of deposit transactions, and the issuance of the e-statement. A cash credit encourages the user to engage in electronic utilization of a financial account.

There is additionally provided a system configured to influence the behavior of a user of a checking account. The system includes a computer readable database configured to store account data and a computer processor coupled to the database. The computer processor includes a means to establish user identity in the database, a means to create a checking account for each user in the database, a means to assign a transaction code to each type of deposit transaction associated with the checking account and totaling each type of deposit transaction based on the transaction code during a current period, a means to determine a net sum of the value of all signature card transactions associated with the checking account less the value of all signature card returns associated with the checking account during the current period, a means to total electronic debits transacted in the checking account during the current period, a means to issue an e-statement for the checking account at the end of the current period, and a means to automatically calculate a cash credit to the checking account for the current period based on the net sum of the net signature card transactions, the total electronic debit transactions, the total of deposit transactions, and the issuance of the e-statement. A cash credit encourages the user to engage in electronic utilization of a checking account.

The system of the present disclosure is of an arrangement which will require little or no manual intervention to be provided by the operator of the system during its operation. The system of the present disclosure is also arranged to enhance its market appeal and to thereby afford it the broadest possible market. Finally, all of the aforesaid advantages are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

Checking accounts are a financial commodity to most financial institutions. Differentiating the checking account product of a particular institution from those of other competing financial institutions in the same geographic area (as well as differentiating from the checking account products of competing online financial institutions) has become increasingly difficult, with so-called "free" checking accounts based upon a minimum balance no longer being as effective to attract and retain checking account holders to a particular financial institution as they once were.

The present system incentivizes account holders by providing a cash bonus for certain activities, including certain deposits, electronic payments, check (debit) card purchases, and the act of receiving electronic statements (instead of requiring paper statements). For example, deposits eligible for bonuses may include paycheck direct deposits and other direct electronic deposits as well as deposits of paper checks. Payments eligible for bonuses may include ACH electronic payments and online bill payments (but not payments by paper check, which cost the financial institution more to process). Examples of check card purchases eligible for bonuses may include Visa check card purchases.

The system of the present invention operates on the normal monthly financial cycle of the financial institution, with the calculation of bonuses occurring automatically on the statement period end date. Each of the categories for which bonuses are paid are tallied to produce totals, the bonuses for each of the types of activities are applied, and the total bonus amount is deposited into the account on the statement period close data, with all of these activities being performed automatically by the system. The present system is optimally designed to incentivize financial account (for example checking account) customer behavior desired by the financial institution, and may also be applicable to other types of financial accounts as well.

Figure 1:
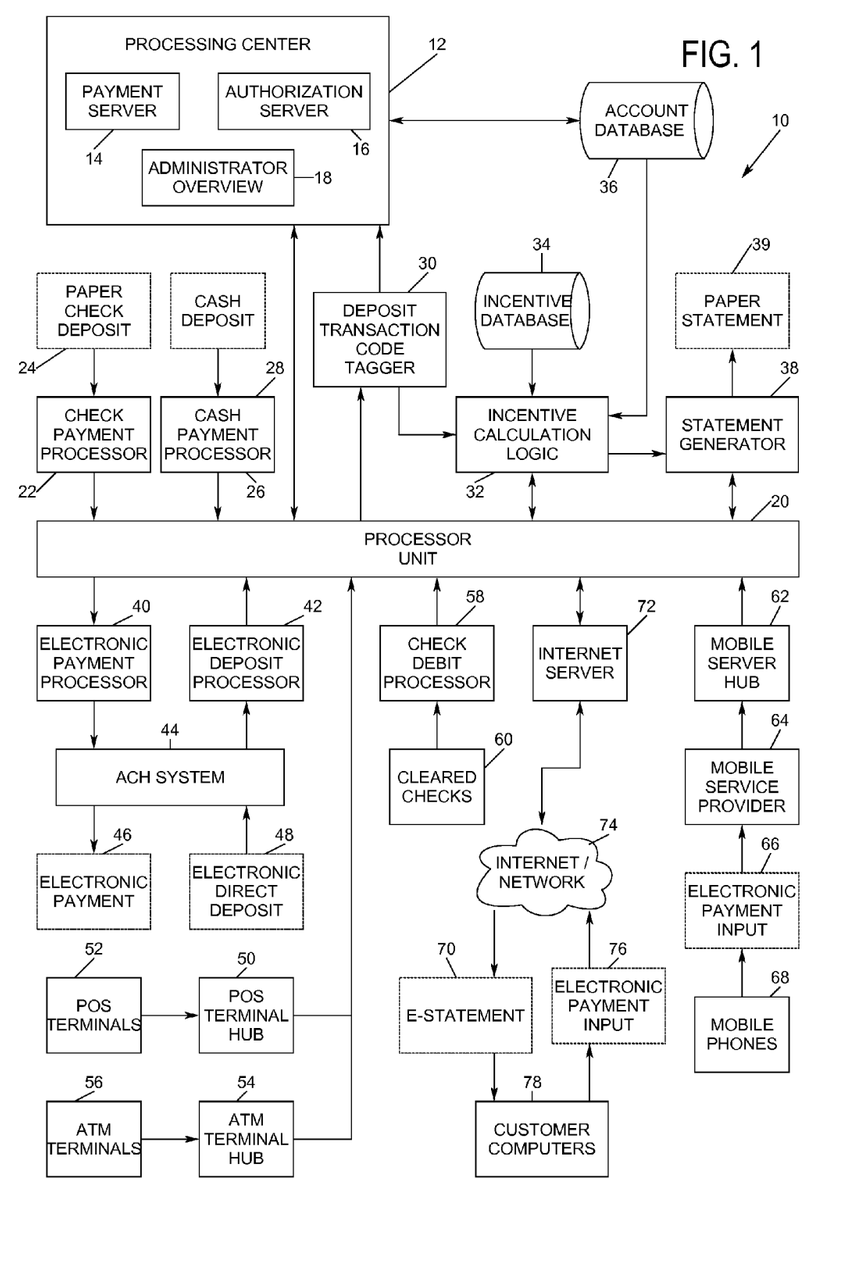
FIG. 1 is a diagram illustrating an exemplary embodiment of a system to incentivize an owner of a financial account to use on-line transactions by providing an amount of cash credited to the financial account at the end of a current time period.

Referring to the figures, FIG. 1 illustrates an exemplary embodiment of a system 10 to incentivize (encourage) an owner of a financial account 80 (shown in FIG. 2) to use on-line banking transactions with the financial account 80 by providing an amount of cash credited to the financial account 80 at the end of a current time period. The current time period typically is a one month period but it may be any roughly monthly period (typically ending on a weekday rather than on a weekend day) as determined by the financial institution that maintains the account.

A financial institution will maintain the system 10 on a computer system that is either maintained in-house or operated by a third party provider. The financial institution may typically be a bank and the financial account 80 may be, for example, a checking account. The system 10 includes a computer processor 20 which is coupled to a processing center 12. The processing center 12 typically includes a payment server 14, an authorization server 16, and an administrator overview 18. The processing center 12 is coupled to an account database 36 in which the information relating to the financial account 80 for a specific user is maintained. The account database 36 is typically a computer readable database configured to store the account data and related information. The processor unit 20 of the system 10 includes a check payment processor 22 which processes paper check deposits 24 made by the user into the financial account 80. The processor unit 20 also includes a cash payment processor 26 which processes any cash deposits 28 made by the user to the financial account 80.

Electronic transactions also referred to as on-line banking transactions are also processed by the processor unit 20. The term "on-line banking" as used herein, encompasses banking services, information, and data. An electronic payment processor 40 is coupled to the processor unit 20 and is in communication with the Automated Clearinghouse Network (ACH) 44 for processing electronic payments 46 made by or on behalf of the user. Such electronic payments may be automatic payments or debits to the financial account or they may be initiated by the user of the financial account 80. An electronic deposit processor is also coupled to the processor unit 20 of the system and is in communication with the ACH system 44 for handling electronic direct deposits 48. Such electronic direct deposits can be, for example, automatic payroll check deposits. The processor unit 20 is also coupled to a point of sale terminal hub 50 for handling point of sale terminal transactions 52 for example purchases at a vendor, supplier, retail stores, etc. The processor unit 20 is further coupled to an automatic teller machine terminal hub 54 which transacts business through automatic teller machine terminals 56. The user of the financial account 80 can withdraw cash or make deposits at an ATM terminal 56 and processed in the processor unit 20.

Various types of deposits are provided with a deposit transaction code in a deposit transaction code tagger 30 which is coupled to the processing center 12 and the processor unit 20.

A check debit processor 58 configured to transact cleared checks 60 is coupled to the processor unit 20. The check debit processor 58 is configured to handle paper checks as well as a check debit card transactions issued by a financial institution or a third party, for example a Visa° check debit card. The check debit card is associated with the financial account 80.

The processor unit 20 is also coupled to an Internet server 72 which communicates, for example, with a customer computer 78 for making electronic payments 76 through the Internet network 74. The Internet server can also provide E-statements 70 issued by the financial institution through a statement generator 38 coupled to the processor unit 20. The E-statement 70 can be sent directly to a customer or user's computer 78 via the Internet 74. It should be understood that the Internet server 72 can communicate with customers or users connected to the Internet through several different types of Internet services such as provided by AOL°, AT&T°, Verizon°, etc.

The system 10 through its processor unit 20 can also transact business with a mobile server hub 62 coupled to the processor unit 20. The mobile server hub 62 is in communication with a mobile service provider 64 through which a user of a mobile phone 68 can make electronic payments 66 through the mobile service provider 64. It should be understood that a variety of mobile service providers can be coupled to the system 10 as determined by the financial institution 10 in cooperation with users of the financial account 80.

An incentive calculation logic module 32 is coupled to the processor unit 20. The incentive calculation module 32 automatically calculates the cash bonus credit used to encourage the owner of the financial account 80 to use on-line banking of the financial account 80. Coupled to the incentive calculation logic module 32 is an incentive database 34. The incentive database 34 maintains the variable bonus credits used in the calculation of the cash back credit to the financial account 80. A more detailed description of the incentive database 34 will be provided below. The account database 36 is also coupled to the incentive calculation logic module 32. The statement generator 38 is also coupled to the incentive calculation logic module 32. The statement generator 38 is configured to prepare and issue a paper statement 39 and an E-statement 70 as determined and requested by the owner of the financial account.

The computer processor unit 20 of the system is coupled to the account database 36. The computer processor unit 20 is configured to establish the user identity in the database 36 and create a financial account 80 for each user in the database 36. The deposit transaction code tagger 30 assigns a transaction code to each type of deposit transaction associated with the financial account 80 and totals each type of deposit transaction based on the transaction code during the current period.

The computer processor unit 20 also determines a net sum of a value of qualified signature card transactions (for example Visa° check debit card) associated with the financial account 80 less the value of signature card returns associated with the financial account 80 during the current period. In one embodiment there is no cap on the number of signature card transactions taking place in the current period for purposes of the cash back credit calculation. In another embodiment the financial institution can limit the number, i.e. cap the total signature card transactions, of signature card transactions for purposes of the cash back credit calculation.

The processor unit further totals all electronic debits transacted in the financial account 80 during the current period. The processor unit 20 further determines if an E-statement 70 for the financial account 80 was issued at the end of the current period. The incentive calculation logic module 32 is configured to automatically calculate a cash credit to the financial account 80 for the current period based on the net sum of the net signature card transactions, the total electronic debit transactions, the total of deposit transactions, and the issuance of whether or not an E-statement was issued.

The total of the cash bonus credit is calculated in the incentive calculation logic module 32 based on the incentive database information 34 to calculate the cash credit which is applied to the financial account 80 to encourage the user to engage in electronic utilization of the financial account 80. The incentive database 34 can be modified from time to time by the financial institutions to change the value of the various features used to calculate the cash back credit. For example, the financial institution can change the percentage of bonus used in the signature card transaction or change the number of signature card transactions eligible for the cash back credit, or both. The financial institution can change any of the dollar amounts, percentages and transaction counts in the incentive database 34 from time to time.

Figure 2:
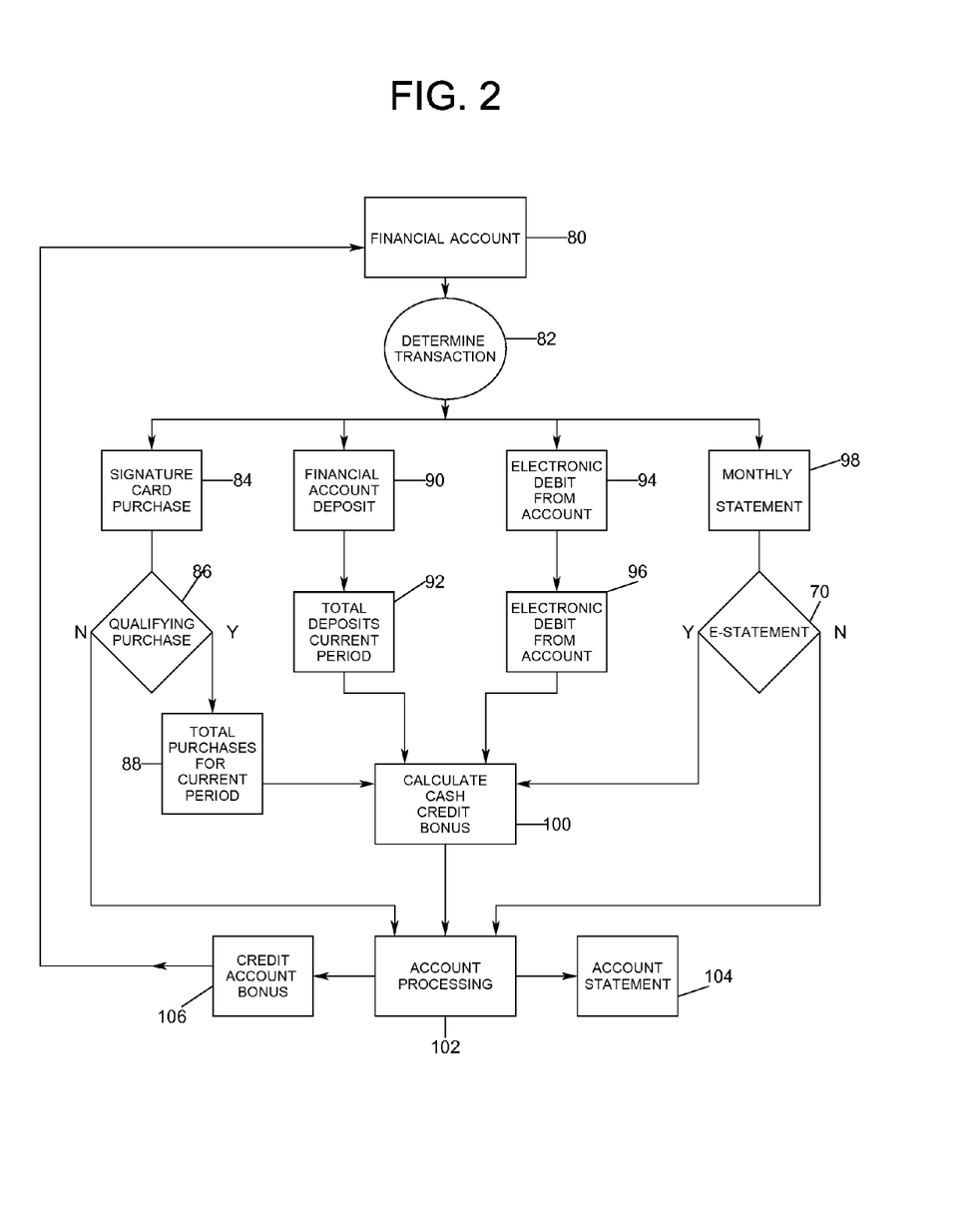
FIG. 2 is a flow chart illustrating the cash back procedure performed by the system illustrated in FIG. 1.

Referring to FIG. 2, there is illustrated an exemplary embodiment of the processing in a financial account 80 in the system 10 illustrated in FIG. 1. The financial account 80 is opened by the financial institution, for example a bank, in the usual and conventional manner either on-line or at a physical facility, for example a branch office of the bank. The account origination system and the deposit account origination system are maintained in the account database 36 which is coupled to the processing center 12 and the computer processor unit 20. It should be understood that the account database 36 may be a plurality of databases associated with a specific user, for example a deposit account database and a separate check card database and a savings account database.

Transactions occurring in the financial account 80 are sorted out by a transaction determination step 82 into a signature card purchase transaction 84, a financial account deposit transaction 90, and an electronic debit account 94, and the issuance of a monthly on-line statement 98. In the cash back bonus calculation described above, the signature card purchase must be a qualifying purchase 86 in order to be totaled for the current period 88 for purposes of calculating the cash credit bonus. To qualify for the cash back bonus the signature card purchase must be processed by a specific check debit card, for example a Visa° network issued check debit card. If the signature card purchase is a qualifying purchase the transaction is maintained and a total of the purchases for a current period is maintained in a file 88 for processing at the end of the current period.

Financial account deposits 90 are totaled for the current period in a file 92 and used for the calculation of the cash credit bonus. Electronic debit transactions 94 from the financial account 80 are maintained in an electronic debit account file 96 and used to calculate the cash back credit bonus at the end of the current period. A monthly statement 98 is generated by the statement generator 38 of the system 10 and can be an E-statement. The fact that the E-statement was issued is used in the calculation of the cash back credit bonus. The various transactions that occur in a current period in the financial account 80 are then processed in an account processing step 102 which receives data from the various transactions and issues an account statement 104 which can be a paper or the E-statement and if there is a credit account bonus 106 based on the calculation of the cash credit bonus 100 the credit amount is credited to the financial account 80 at the end of the current period.

It should be understood that deposits made to the financial account 80 can be deposits made at an ATM machine, or by automatic external ACH deposits, by deposits made at a physical facility of the financial institution, for example at a teller window, or by internal transfer deposits from, for example, a savings account into the checking account. It should be also understood that the electronic debits can be made by on-line bill payments by the user at a customer computer 78 or by internal payments at the financial institution by transfer of funds from one account to another or by external ACH payments.

Figure 3:
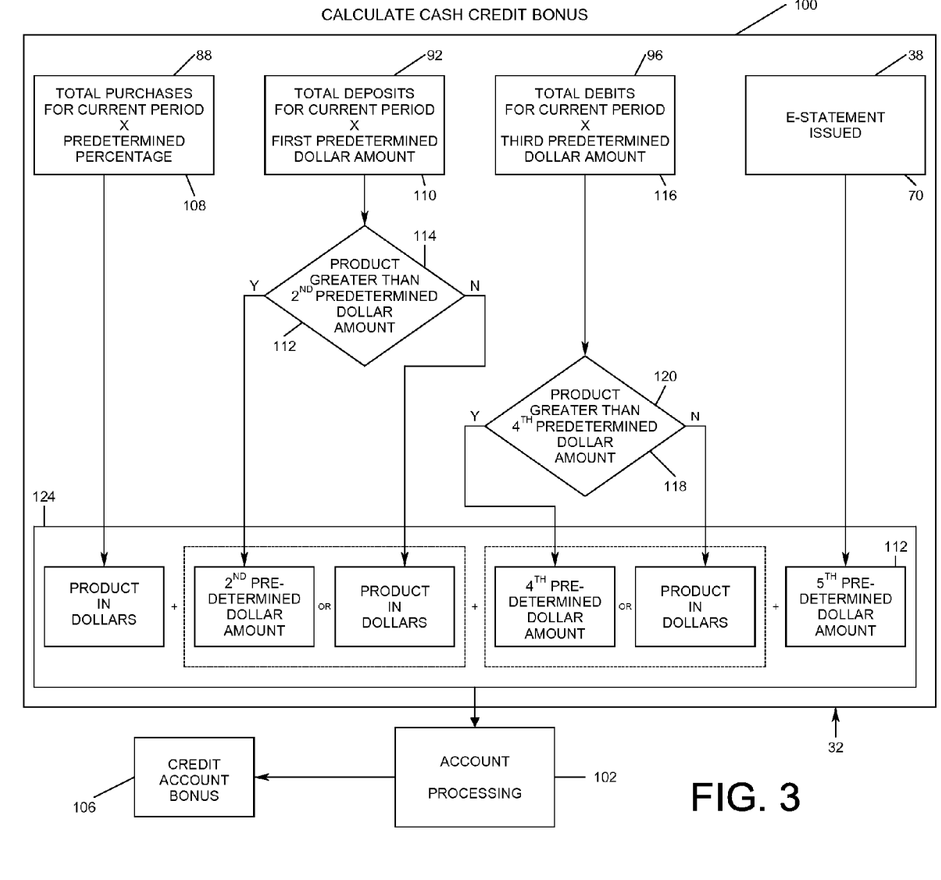
FIG. 3 is a flow chart illustrating the cash back calculation performed by the system illustrated in FIG. 1 in the incentive calculation logic module.

Referring to FIG. 3 there is illustrated the calculation of the cash credit bonus represented by the block 100 in FIG. 2. The calculation of the cash credit bonus is performed in the incentive calculation logic module 32 which is coupled to the computer processor unit 20 of the system 10.

The total purchases for the current period that qualify as signature card purchases are maintained in a file 88 during the current period. At the end of the current period the total purchases are multiplied by a predetermined percentage 108 that is received from the incentive database 34. The product of that calculation in dollars is maintained in the cash bonus credit additional file 124.

The total deposits made in the current period 92 are multiplied by a first predetermined dollar amount 110 which is obtained from the incentive database 34 of the system 10. The product of that calculation is compared to a second predetermined dollar amount 112 which is also obtained from the incentive database 34. If the product is greater than the second predetermined dollar amount then the second predetermined dollar amount is added in the cash bonus credit addition file 124. If the product is not greater than the second predetermined dollar amount, then it is the product in dollars that is maintained in the cash bonus credit addition file 124 for the current period.

The total debits for the current period 96 is multiplied by a third predetermined dollar amount 116 which is obtained from the incentive database 34 of the system 10. The product is compared to a fourth predetermined dollar amount at 120. If the product is greater than the fourth predetermined dollar amount 118 the fourth predetermined dollar amount is maintained in the cash bonus credit addition file 124 for the current period. If the product is not greater than the fourth predetermined dollar amount then the product in dollars is maintained in the cash bonus credit addition file 124.

If an E-statement 70 is issued by the statement generator 38 a fifth predetermined dollar amount 112 is maintained in the cash bonus credit addition file 124.

At the end of the current period the various dollar amounts maintained in the cash bonus credit addition file 124 are added together and sent to account processing 102 to automatically credit the account bonus 106 to the financial account 80.

It should be understood that the predetermined percentage 108, the first predetermined dollar amount 110, the second predetermined dollar amount 112, the third predetermined dollar amount 116, the fourth predetermined dollar amount 118, and the fifth predetermined dollar amount 112 can be changed from time to time by the financial institution because of economic conditions, or promotional purposes or the like. The changes that occur to any or all of the percentages or amounts are maintained in the incentive database 34 and used by the incentive calculation logic module 32 coupled to the computer processor unit 20 of the system 10 to determine the cash back credit.

It should also be understood that the system 10 includes various and typical input devices, such as keyboard, mouse, touch screen and the like either hardwired or wirelessly coupled to the system 10 and likewise output devices, such as computer screen, printer or the like are also coupled to the system 10.

For an example of the system 10 in operation assume a statement cycle activity as follows. A current time period for purposes of this example will be from May 25th through June 24th representing a typical 30-day financial cycle period. During that current time period the account transactions for the user or consumer (owner of the financial account) is as follows:

On May 31st, two payroll direct deposits are made to the account;

On June 1st, the user has a mortgage payment made through the automated clearing house network (ACH);

On June 6th, the user makes a $425.00 Visa check card purchase;

On June 5th, the user pays three bills online designating the financial account for debit;

On June 8th, the user deposits a check in the financial account;

On June 8th, the user makes a $255.00 Visa check card purchase;

On June 14th, the user makes a $300.00 Visa check card purchase;

On June 15th, two payroll direct deposits are made to the financial account;

On June 20th, the user makes three online bill payments designating the financial account for debit;

On June 22nd, the user makes a $600.00 Visa check card purchase; and

On June 24th, the end of the statement period, an E-statement is produced and sent to the user.

At the end of the current time period, the system 10 will automatically calculate a cash back credit to the financial account 80, based on the information as stated above. For this example the financial account 80 is a checking account. Specifically, the total qualifying purchases is accumulated in the total purchase for the current period 88 file which totals $1,580.00. In accord with the exemplary embodiment, the system 10 will automatically credit the customer an amount equal to the total purchase for a current period 88 times the predetermined percentage 108 which for this example is 0.25% thereby equaling $3.95.

During the current time period, the user had one ACH mortgage payment made and made six online bill payments. The system 10 totals the debits for the current period 96 and multiplies it times a third predetermined dollar amount 116 which for this example is $0.05. The total debits during the current time period is 7 and the fourth predetermined dollar amount 118 in the exemplary embodiment is $2.00. Since the product ($0.05 times 7 equaling $0.35 is less than $2.00, the $0.35 is used in the cash bonus calculation.

During the current time period, the user had five deposits made to the financial account. The system 10 automatically calculates the credit to the customer by multiplying the total deposits 92 by the first predetermined dollar amount 110. In this example, the total deposits were five and the first predetermined dollar amount was $0.25. The product of the total deposits 92 times the first predetermined dollar 110 amount is $1.25. Since the product is not greater than a second predetermined dollar 112 amount which in the present example is $2.00, the $1.25 will be added to the cash back credit.

In the example, at the end of the current time period, an E-statement was issued and therefore the fifth predetermined dollar 112 amount which in this example is $0.25 is added to the cash credit amount.

The system 10 by the computer processor 20 which includes the incentive calculation logic module and the incentive database 34 automatically does the calculation for the cash back bonus and provides that dollar amount to account processing 102 and then to credit the account bonus 106 to the financial account 80.

In the present example, at the end of the current period (June 24th), the system 10 totals the various elements of the cash bonus, calculated as described above, to be cash bonus check card purchase of $3.95, the cash bonus on-line payment of $0.35, the cash bonus deposit of $1.25, and the cash bonus E-statement of $0.25, totaling $5.80. The $5.80 is credited at the end of that current period directly to the financial account 80.

As can be seen, the more purchases made by the user using the user check card making online bill payments through the financial account and making multiple deposits to the financial account with the issuance of an e-statement at the end of the current time period results in a higher cash bonus credit to the financial account 80 thereby providing an incentive to the user to maximize the on-line banking use of the financial account 80. As a result of the increased online activity of the financial account 80, the financial institution saves processing time and money and a part of such savings flows back to the user through the cash bonus to the financial account 80.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present system has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the invention as described herein may be made, none of which depart from the spirit or scope of the present disclosure. The particular embodiments and applications were chosen and described to provide the best illustration of the principles of the system and its practical application to thereby enable one of ordinary skill in the art to utilize the system in various embodiments with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A system configured to influence the behavior of a user of a financial account, the system comprising:
    a computer readable database configured to store account data; and
    a computer processor coupled to the database, with the computer processor configured to:
        establish user identity in the database;
        create a financial account for each user in the database;
        assign a transaction code to each type of deposit transaction associated with the financial account and totaling each type of deposit transaction based on the transaction code during a current time period;
        determine a net sum of the value of all signature card transactions associated with the financial account less the value of all signature card returns associated with the financial account during the current period;
        total electronic debits transacted in the financial account during the current period;
        issue an E-statement for the financial account at the end of the current period; and
        including an incentive calculation logic module configured to automatically calculate a cash credit to the financial account for the current period based on the net sum of the net signature card transactions, the total electronic debit transactions, the total of deposit transactions, and issuance of the E-statement;
    wherein the cash credit encourages the user to engage in electronic utilization of the financial account.

2. The system of claim 1, wherein the incentive calculation logic module is further configured to multiply the sum of the net signature card transactions by a predetermined percentage.

3. The system of claim 2, wherein the predetermined percentage is 0.25 percent.

4. The system of claim 1, wherein the incentive calculation logic module is further configured to multiply the total of deposit transactions by a first predetermined dollar amount and add to the cash credit the lesser of the resultant product and a second predetermined dollar amount.

5. The system of claim 4, wherein the first predetermined dollar amount is $0.25 and the second predetermined dollar amount is $2.00.

6. The system of claim 1, wherein the incentive calculation logic module is further configured to multiply total debit transactions by a third predetermined dollar amount and add to the cash credit the lesser of the resultant product and a fourth predetermined dollar amount.

7. The system of claim 6, wherein the third predetermined dollar amount is $0.05 and the fourth predetermined dollar amount is $2.00.

8. The system of claim 1, wherein the incentive calculation logic module is further configured to add a fifth predetermined dollar amount to the cash credit if the E-statement is issued.

9. The system of claim 8, wherein the fifth predetermined dollar amount is $0.25.

10. The system of claim 1, wherein the financial account is a checking account.

11. A system configured to influence the behavior of a user of a financial account, the system comprising:
    a computer readable database configured to store account data; and
    a computer processor coupled to the database, with the computer processor including:
        a means to establish user identity in the database;
        a means to create a financial account for each user in the database;
        a means to assign a transaction code to each type of deposit transaction associated with the financial account and totaling each type of deposit transaction based on the transaction code during a current period;
        a means to determine a net sum of the value of all signature card transactions associated with the financial account less the value of all signature card returns associated with the financial account during the current period;
        a means to total electronic debits transacted in the financial account during the current period;
        a means to issue an E-statement for the financial account at the end of the current period; and
        a means to automatically calculate a cash credit to the financial account for the current period based on the net sum of the net signature card transactions, the total electronic debit transactions, the total of deposit transactions, and issuance of the E-statement;
    wherein the cash credit encourages the user to engage in electronic utilization of the financial account.

12. The system of claim 11, wherein the means to calculate a cash credit is configured to multiply the sum of the net signature card transactions by a predetermined percentage.

13. The system of claim 12, wherein the predetermined percentage is 0.25 percent.

14. The system of claim 11, wherein the means to calculate a cash credit is configured to multiply the total of deposit transactions by a first predetermined dollar amount and add to the cash credit the lesser of the resultant product and a second predetermined dollar amount.

15. The system of claim 14, wherein the first predetermined dollar amount is $0.25 and the second predetermined dollar amount is $2.00.

16. The system of claim 11, wherein the means to calculate a cash credit is configured to multiply total debit transactions by a third predetermined dollar amount and add to the cash credit the lesser of the resultant product and a fourth predetermined dollar amount.

17. The system of claim 16, wherein the third predetermined dollar amount is $0.05 and the fourth predetermined dollar amount is $2.00.

18. The system of claim 11, wherein the means to calculate a cash credit is configured to add a fifth predetermined dollar amount to the cash credit if the E-statement is issued.

19. The system of claim 18, wherein the fifth predetermined dollar amount is $0.25.

20. The system of claim 11, wherein the financial account is a checking account.

21. A system configured to influence the behavior of a user of a checking account, the system comprising:
   a computer readable database configured to store account data; and
   a computer processor coupled to the database, with the computer processor including:
      a means to establish user identity in the database;
      a means to create a checking account for each user in the database;
      a means to assign a transaction code to each type of deposit transaction associated with the checking account and totaling each type of deposit transaction based on the transaction code during a current period;
      a means to determine a net sum of the value of all signature card transactions associated with the checking account less the value of all signature card returns associated with the checking account during the current period;
      a means to total electronic debits transacted in the checking account during the current period;
      a means to issue an E-statement for the checking account at the end of the current period; and
      a means to automatically calculate a cash credit to the checking account for the current period based on the net sum of the net signature card transactions, the total electronic debit transactions, the total of deposit transactions, and issuance of the E-statement;
   wherein the cash credit encourages the user to engage in electronic utilization of the checking account.

22. The system of claim 21, wherein the means to calculate a cash credit is configured to multiply the sum of the net signature card transactions by a predetermined percentage.

23. The system of claim 22, wherein the predetermined percentage is 0.25 percent.

24. The system of claim 21, wherein the means to calculate a cash credit is configured to multiply the total of deposit transactions by a first predetermined dollar amount and add to the cash credit the lesser of the resultant product and a second predetermined dollar amount.

25. The system of claim 24, wherein the first predetermined dollar amount is $0.25 and the second predetermined dollar amount is $2.00.

26. The system of claim 21, wherein the means to calculate a cash credit is configured to multiply total debit transactions by a third predetermined dollar amount and add to the cash credit the lesser of the resultant product and a fourth predetermined dollar amount.

27. The system of claim 26, wherein the third predetermined dollar amount is $0.05 and the fourth predetermined dollar amount is $2.00.

28. The system of claim 21, wherein the means to calculate a cash credit is configured to add a fifth predetermined dollar amount to the cash credit if the E-statement is issued.

29. The system of claim 28, wherein the fifth predetermined dollar amount is $0.25.

* * * * *

UNITED STATES PATENT AND TRADEMARK OFFICE
CERTIFICATE OF CORRECTION

| | | |
|---|---|---|
| PATENT NO. | : 8,160,921 B2 | Page 1 of 2 |
| APPLICATION NO. | : 12/608719 | |
| DATED | : April 17, 2012 | |
| INVENTOR(S) | : Pamela K. Gebhardt et al. | |

It is certified that error appears in the above-identified patent and that said Letters Patent is hereby corrected as shown below:

Col. 4, Line 19
"payments or debits to the financial account or they may" should read --payments or debits to the financial account 80 or they may--.

Col. 4, Line 21
"deposit processor is also coupled to the processor unit" should read --deposit processor 42 is also coupled to the processor unit--.

Col. 4, Line 41
"or a third party, for example a Visa° check debit card. The" should read --or a third party, for example a Visa® check debit card. The--.

Col. 4, Lines 53-54
"of Internet services such as provided by AOL°, AT&T°, Verizon°, etc." should read --of Internet services such as provided by AOL®, AT&T®, Verizon®, etc.--.

Col. 5, Line 24
"example Visa° check debit card) associated with the financial" should read --example Visa® check debit card) associated with the financial--.

Col. 6, Line 13
"debit card, for example a Visa° network issued check debit" should read --debit card, for example a Visa® network issued check debit--.

Col. 8, Line 38
"includes the incentive calculation logic module and the" should read --includes the incentive calculation logic module 32 and the--.

Signed and Sealed this
Twenty-ninth Day of May, 2012

David J. Kappos
*Director of the United States Patent and Trademark Office*

Col. 9, Line 19
"skill in the art to utilize the system in various embodiments" should read --skill in the art to utilize the system in various embodiments and--.